United States Patent [19]

Ward

[11] Patent Number: 4,533,814
[45] Date of Patent: Aug. 6, 1985

[54] LASER PIPE WELDER/CUTTER

[75] Inventor: Brooke A. Ward, Goring on Thames, England

[73] Assignee: United Kingdom Atomic Energy Authority, London, England

[21] Appl. No.: 462,475

[22] Filed: Jan. 31, 1983

[30] Foreign Application Priority Data

Feb. 12, 1982 [GB] United Kingdom ............... 8204249

[51] Int. Cl.³ .............................................. B23K 27/00
[52] U.S. Cl. ..................... 219/121 LD; 219/121 LC; 219/121 LG; 219/121 LN; 219/121 LT; 219/121 LV; 901/42; 901/47
[58] Field of Search ................ 219/121 LC, 121 LD, 121 LG, 121 LS, 121 LT, 121 219/121 LN, 121 LG, 121 LS, 121 LT, 219/121 LU, 121 LV; 901/6, 42, 47

[56] References Cited

U.S. PATENT DOCUMENTS 4,424,211  1/1984  Carstens ..................... 219/121 LC Primary Examiner—C. L. Albritton
Attorney, Agent, or Firm—William R. Hinds

[57] ABSTRACT

A laser pipe welder/cutter for use where a pipe to be welded or cut cannot be rotated, consisting of a focusing head mounted on a carriage which runs on a track surrounding a hole in a base plate through which a section of pipe to be operated upon can project. The focusing head is arranged to maintain the laser beam at normal incidence to the pipe as it traverses around the pipe and is linked to a laser source via a flexible laser beam guide which consists of at least two rigid sections joined by optical elbow joints which permit motion about two mutually perpendicular axes, the lengths of the rigid sections being such that the laser focusing head can traverse more than a full circle around the pipe without the rigid sections of the laser beam guide coming into contact with the pipe.

3 Claims, 4 Drawing Figures

LASER PIPE WELDER/CUTTER

The present invention relates to a device for carrying out processing operations on a workpiece by means of a laser in circumstances when it is not practicable to rotate the workpiece to present different portions of its surface to the laser beam to be operated upon.

There are a number of laser materials processing applications, such as welding or cutting, which require the focus of a laser beam to be moved circumferentially around a cylindrical workpiece which cannot be rotated to present different parts of its surface to the laser beam. One such application is the welding together of sections of piping on site to form a continuous pipeline. In such a case it is not possible to rotate the workpiece, and the focusing head for the laser beam must be moved around the clamped butt joints of two sections of pipe. The laser beam must be maintained at near normal incidence to the surface of the pipe and moved around it by more than a complete circle so as to ensure that the weld is complete. The same requirement exists if the laser beam is to be used to cut a length of pipe in two.

According to the present invention there is provided a laser processing apparatus comprising, a focusing head which is mounted on a carriage which is adapted to follow a closed path around a position at which a stationary workpiece to be processed by the laser beam may be placed whilst maintaining the laser beam at normal incidence to the workpiece and bringing it to a focus at the surface of the workpiece, a flexible laser beam guide connecting the focusing head to a stationary laser beam guide, the flexible laser beam guide including at least three optical elbow joints each having an angular movement of more than two hundred and seventy degrees and means for reflecting the laser beam from one optical elbow joint to another and thence to the focusing head, a first of the optical elbow joints being associated with the focusing head, a second of the optical elbow joints being associated with the fixed laser beam guide and the third optical elbow joint being intermediate the first and second optical elbow joints and separated from them by distances such that the focusing head can traverse more than a full circuit around the workpiece without the flexible beam guide coming into contact with the workpiece.

In one form of the invention, the second optical elbow joint is provided with a rotational capability about an axis which is coincident with that of the portion of the fixed laser beam guide to which it is attached, and the focusing head carriage is constrained to move on a track which is mounted on a single axis gimbal frame which is pivoted about the same axis thus enabling the laser beam to act on a workpiece which has its axis at any orientation in a plane at right angles to the gimbal axis.

The invention will now be described by way of example, with reference to the accompanying drawings, in which.

Figure 1:
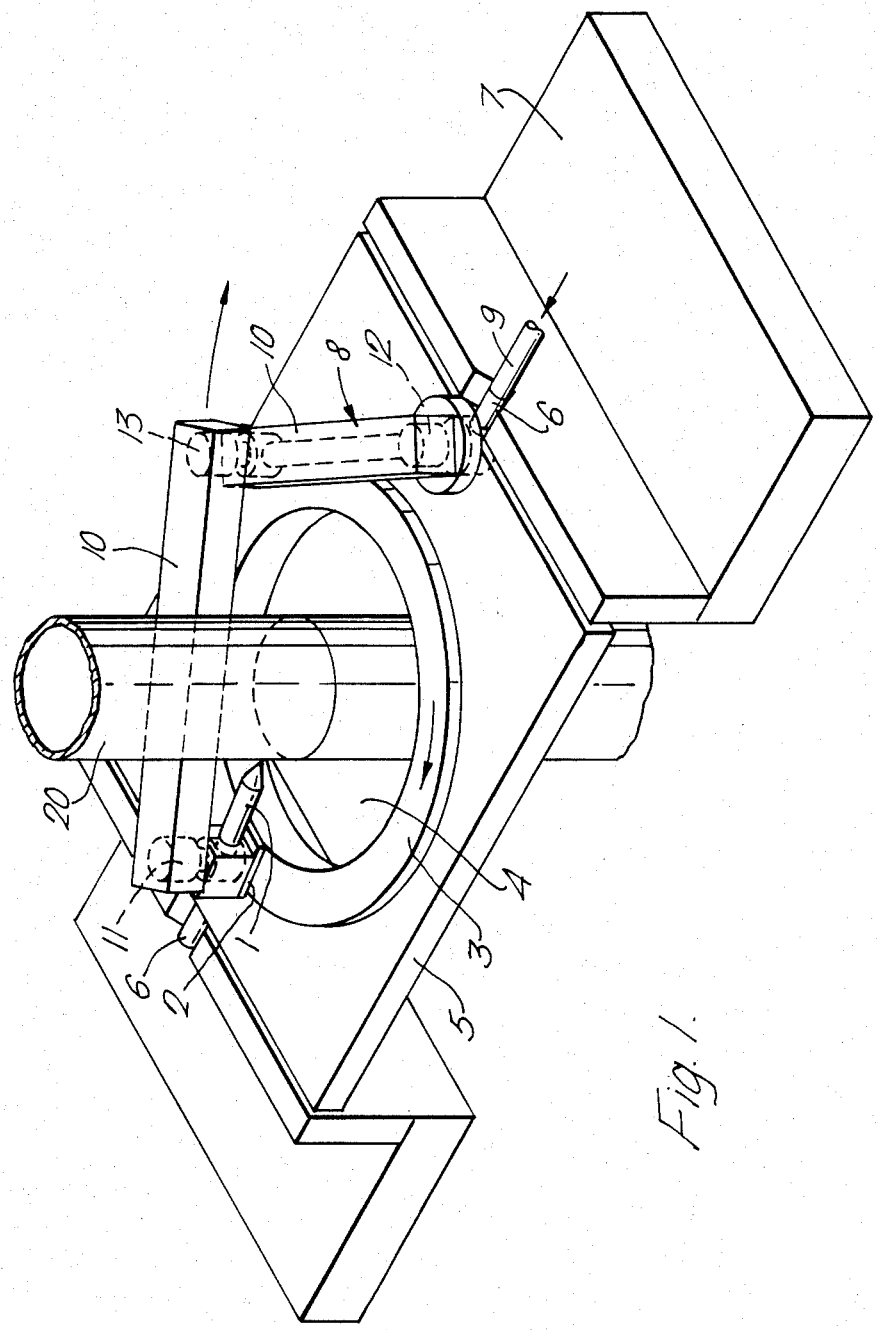
FIG. 1 is a schematic representation of a pipe welding or cutting apparatus embodying the invention.

Referring to FIG. 1, an orbital laser welder/cutter consists of a focusing head 1 which is mounted on a carriage 2 which runs on a track 3 which surrounds a hole 4 in a base plate 5. The base plate 5 is in turn mounted on trunnions 6 which form part of a supporting structure 7. The supporting structure 7 acts as a single axis gimbal frame. The focusing head 1 is fixed to the carriage 2 in a position such that a radial alignment of the focusing head 1 is maintained as the carriage 2 moves around the track 3. A flexible laser beam guide, shown generally by the numeral 8 connects the focusing head 1 to a fixed laser beam guide 9. The fixed portion of the laser beam guide 9 passes through the centre of one of the trunnions 6. For protective purposes, the flexible laser beam guide 8 is provided with an articulated outer casing 10. The flexible laser beam guide 8 includes three elbow joints 11, 12 and 13. The elbow joint 11 conveys light to the focusing head 1, the elbow joint 12 connects the flexible laser beam guide 8 to the fixed laser beam guide 9, and the elbow joint 13 is intermediate the other two elbow joints. Corresponding articulation is provided in the outer casing 10. The elbow joints 11, 12 and 13 will be described in more detail later. Each elbow joint is universal in its action with an angular movement of more than 270°. This, coupled with the separation between the pairs of elbow joints 11 and 13 and 12 and 13, respectively, enables the focusing head 1 to travel more than a full circle around the track 3 without the flexible beam guide 8 coming into contact with a workpiece projecting through the hole 4 in the base plate 5.

For example, to provide for the welding or cutting of a workpiece in the form of piping 20 with a nominal diameter of 40 units passing through the hole 4 in the base plate 5, the axis of rotation of the elbow joint 11 perpendicular to the plane of the base plate 5 should move around a circle of radius 70 units centred on the hole 4 in the base plate 5, the corresponding axis of rotation of the elbow joint 12 should be 110 units from the centre of the hole 4 in the base plate 5, and the separations between the corresponding axes of rotation of the elbow joints 11 and 13 and 12 and 13, respectively, should be 132.9 and 92.9 units.

Figure 2:
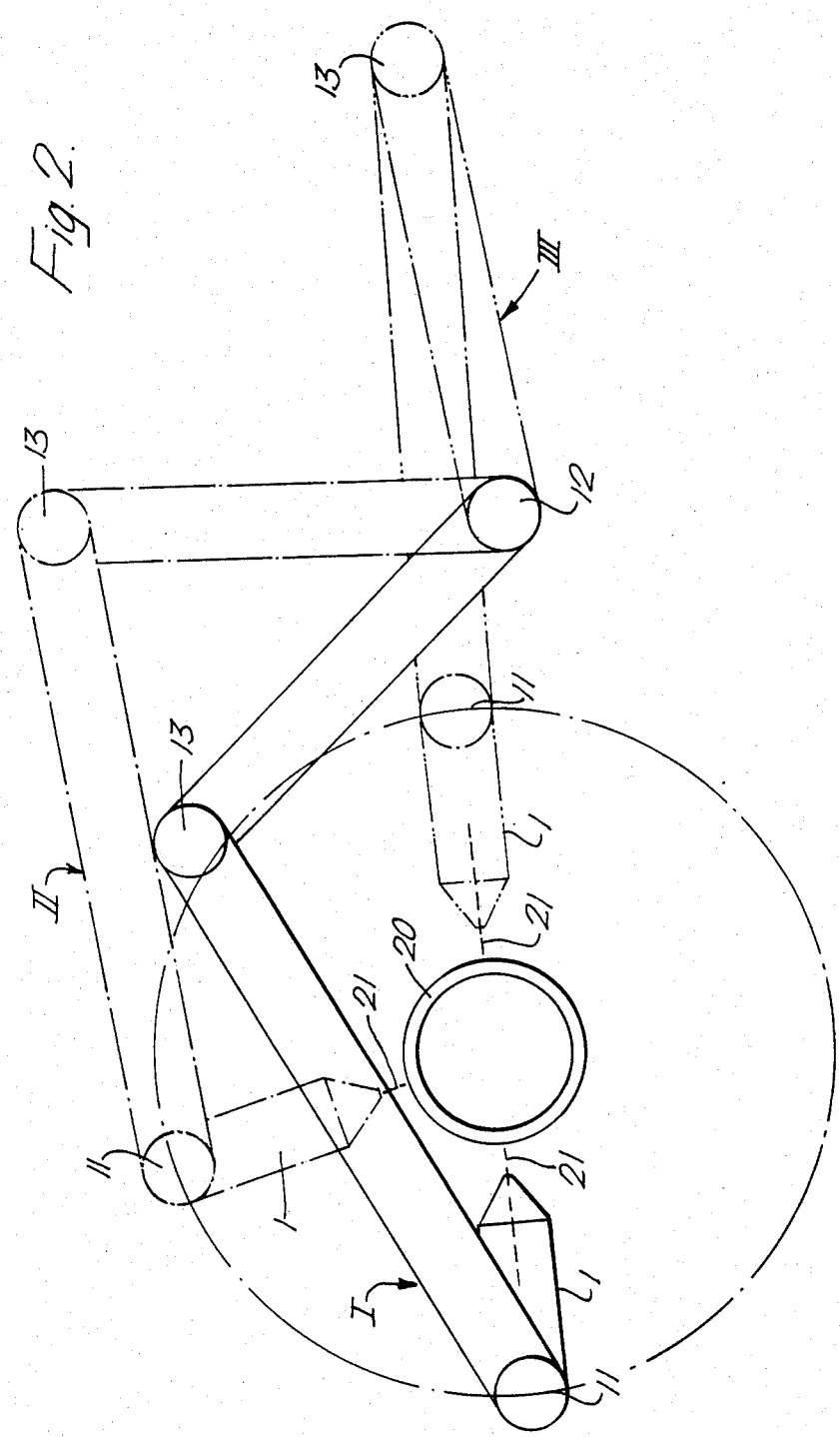
FIG. 2 illustrates the action of the apparatus of FIG. 1.

The action of a flexible beam guide 8 with such dimensions is illustrated in FIG. 2. As the action of the flexible laser beam guide 8 is symmetrical, only half a complete circuit is shown. The motion starts from the position labelled I, proceeds to position II, and thence to position III. The remaining part of the motion is a mirror image of that shown. The starting position is such that the optic axis 21 of the focusing head 1 rotates through some 370° in a complete cycle of operation, so ensuring the complete joining or severance of sections of piping 20.

Figure 3:
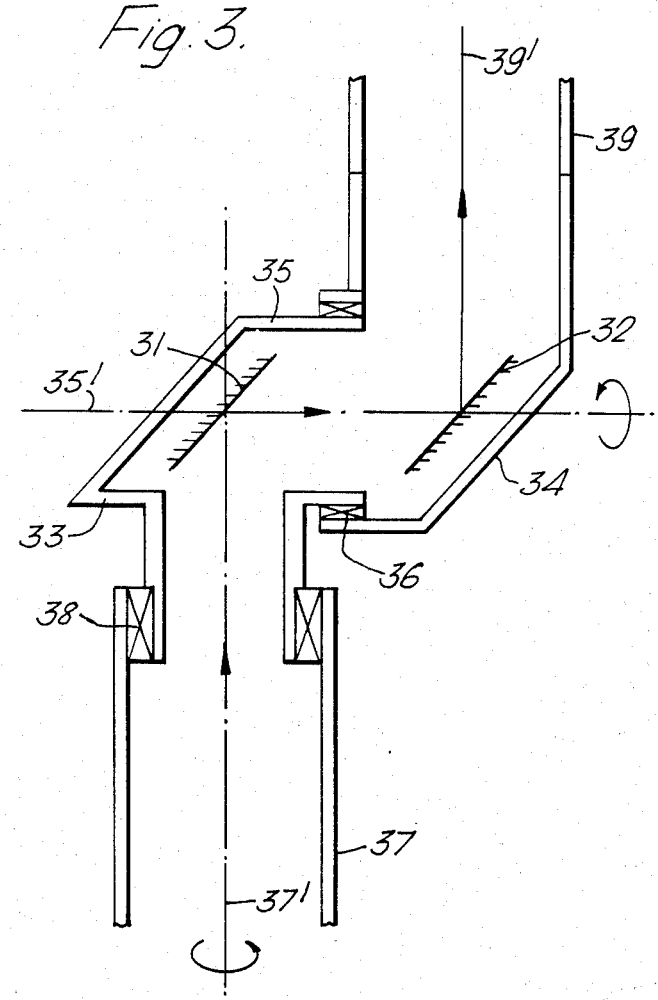
FIG. 3 is a longitudinal section of a type of optical elbow joint which can be incorporated in the apparatus of FIG. 1.

FIG. 3 shows the construction of one form of elbow joint. In this form of elbow joint, an input mirror 31 and an output mirror 32 are mounted in input and output parts 33 and 34, respectively, of the elbow joint. The input and output parts 33 and 34 of the elbow joint are joined by a short intermediate section 35 which incorporates a journal bearing 36 such that the input and output parts 33 and 34 of the elbow joint can rotate relative to each other about the longitudinal axis 35' of the intermediate section 35 of the elbow joint. The input part 33 of the elbow joint is joined to its associated section 37 of the laser beam guide by means of a joint which includes another journal bearing 38. The bearing 38 enables the input part 33 of the elbow joint to rotate about the longitudinal axis 37' of the section 37 of the laser beam guide. The output part 34 of the elbow joint is joined rigidly to its associated section 39 of the laser beam guide. The bearings 36 and 38 provide for a universal action of the elbow joint.

The mirrors 31 and 32 are so positioned that when the longitudinal axes 37', 35' and 39' of the sections 37, 35 and 39 of the laser beam guide are co-planar, the mirrors 31 and 32 are parallel and at an angle of 45° to the longitudinal axes 37', 35' and 39' of the sections 37, 35 and 39 of the laser beam guide. Thus these axes form the optic axis of the optical system formed by the mirrors 31 and 32. A beam 40 of laser radiation entering the elbow joint along the axis 37' of the section 37 of the laser beam guide will leave the elbow joint along the axis 39' of the section 39 of the laser beam guide whatever the relative positions of the input and output parts 33 and 34 of the elbow joint.

Figure 4:
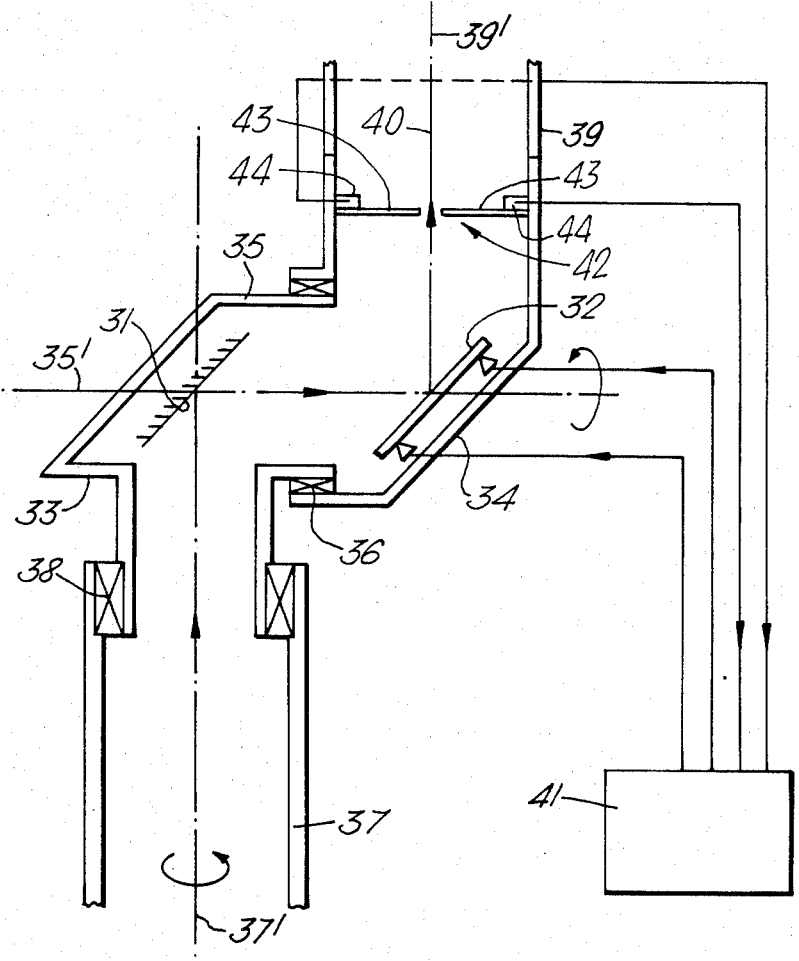
FIG. 4 is a longitudinal section of a second type of optical elbow joint which can be incorporated in the apparatus of FIG. 1.

For the above statement to be true, it is necessary for the bearings 36 and 38 to be of high quality, and great care is needed in the manufacture and assembly of the components of the elbow joint. FIG. 4 shows a form of elbow joint in which these conditions can be relaxed. The general principles of construction are the same as those of the elbow joint which has been described already so the construction of the elbow joint will not be described in detail again, and those components which are similar to those in the elbow joint already described are given the same reference numbers. The two forms of the elbow joint differ in that instead of the mirrors 31 and 32 being accurately pre-aligned, one of them, in the illustration the output mirror 32 although it can be either of them, is mounted so that it can be moved about two perpendicular axes, and there is provided a servo mechanism 41 which maintains the alignment of the mirrors required to ensure that the laser beam 40 leaving the elbow joint does so along the axis 39' of the section 39 of the laser beam guide whatever the relative positions of the input and output parts 33 and 34 of the elbow joint. This being so, the requirement for great precision in the construction of the elbow joint, and in particular the journal bearings 36 and 38 can be relaxed. To provide the necessary input information for the servo mechanism 41, any convenient form of laser beam position sensor can be used such as a diaphragm 42 divided into quadrants 43 each of which has a temperature sensor 44 associated with it.

Although only three elbow joints, as described, are necessary to provide a functional system, to accommodate manufacturing errors, it is desirable to include an additional elbow joint in one of the sections of the flexible laser beam guide 8. Alternatively, one of the sections of the flexible laser beam guide 8 can be provided with a telescopic joint.

The rotational capacity provided between the fixed and flexible portions of the laser beam guide 8 and 9 repectively, by means of the input part journal bearing of the elbow joint 12 and the trunnions 6 enable the base plate 5 to move about an axis which is coincident with the longitudinal axis of the fixed laser beam guide 9. Thus the required orientation of the operating laser beam in relation to the piping 20 can be maintained whatever the orientation of the axis of the piping 20 in a plane perpendicular to the axis of rotation of the base plate 5.

I claim:

1. A laser processing apparatus comprising, a focusing head which is mounted on a carriage which is adapted to follow a closed path around a position at which a stationary workpiece to be processed by a laser beam may be placed whilst maintaining the laser beam at normal incidence to the workpiece and bringing it to a focus at the surface of the workpiece, a flexible laser beam guide connecting the focusing head to a stationary laser beam guide, the flexible laser beam guide including at least three optical elbow joints each having an angular movement of more than two hundred and seventy degrees and means for reflecting the laser beam from one optical elbow joint to another and thence to the focusing head, a first of the optical elbow joints being associated with the focusing head, a second of the optical elbow joints being associated with the fixed laser beam guide and the third optical elbow joint being intermediate the first and second optical elbow joints and separated from them by distances such that the focusing head can traverse more than a full circuit around the workpiece without the flexible beam guide coming into contact with the workpiece.

2. A laser processing apparatus according to claim 1, wherein the second optical elbow joint is provided with a rotational capability about an axis which is coincident with that of the portion of the fixed laser beam guide to which it is attached, and the focusing head carriage is constrained to move on a track which is mounted on a single axis gimbal frame which is pivoted about the same axis thus enabling the laser beam to act on a workpiece which has its axis at any orientation in a plane at right angles to the gimbal axis.

3. A laser processing apparatus according to claim 1 or claim 2, wherein each optical elbow joint includes a mirror in a mounting which is adapted to be moved about two perpendicular axes, means for sensing the position of a laser beam traversing the optical elbow joint in relation to the optical axis of the optical elbow joint and generating electrical signals related thereto, and a servo mechanism arranged to vary the orientation of the movable mirror to cause the path of the laser beam to be co-axial with the optical axis of the optical elbow joint.

* * * * *